(12) United States Patent
Wang et al.

(10) Patent No.: US 12,185,455 B2
(45) Date of Patent: Dec. 31, 2024

(54) INTRUSION DETECTION APPARATUS FOR AN INFORMATION HANDLING SYSTEM

(71) Applicant: Dell Products L.P., Round Rock, TX (US)

(72) Inventors: Chun-Che Wang, Hsinchu (TW); Li Hsu, Taipei (TW); Ciao Han Lin, Kaohsiung (TW)

(73) Assignee: Dell Products L.P., Round Rock, TX (US)

( * ) Notice: Subject to any disclaimer, the term of this patent is extended or adjusted under 35 U.S.C. 154(b) by 393 days.

(21) Appl. No.: 17/658,162

(22) Filed: Apr. 6, 2022

(65) Prior Publication Data

US 2023/0328878 A1    Oct. 12, 2023

(51) Int. Cl.
| | |
|---|---|
| G06F 1/16 | (2006.01) |
| G06F 21/62 | (2013.01) |
| G06F 21/86 | (2013.01) |
| H05K 1/02 | (2006.01) |
| H05K 5/00 | (2006.01) |
| H05K 5/02 | (2006.01) |
| H05K 7/00 | (2006.01) |

(52) U.S. Cl.
CPC .......... *H05K 1/0275* (2013.01); *G06F 21/62* (2013.01); *G06F 21/86* (2013.01); *H05K 5/0208* (2013.01)

(58) Field of Classification Search
CPC .. H05K 1/0275; H05K 5/0208; H05K 5/0204; G06F 21/62; G06F 21/86; G06F 21/87; G06F 21/00
See application file for complete search history.

(56) References Cited

U.S. PATENT DOCUMENTS

| | | | | |
|---|---|---|---|---|
| 10,496,854 | B1* | 12/2019 | Lillestolen | H05K 1/165 |
| 11,087,301 | B1* | 8/2021 | Razaghi | G07F 7/088 |
| 11,797,966 | B2* | 10/2023 | Razaghi | G06F 21/86 |
| 2003/0229795 | A1* | 12/2003 | Kunigkeit | G06F 21/87 |
| | | | | 713/189 |
| 2013/0153272 | A1* | 6/2013 | Chiu | H05K 1/0215 |
| | | | | 174/257 |
| 2016/0055958 | A1* | 2/2016 | Chen | H05K 1/0298 |
| | | | | 336/200 |
| 2016/0308391 | A1* | 10/2016 | Easton | B60L 53/124 |
| 2019/0095655 | A1* | 3/2019 | Krawczewicz | H04L 9/3249 |
| 2020/0134241 | A1* | 4/2020 | Lillestolen | G06F 1/3203 |
| 2020/0393875 | A1* | 12/2020 | Kennedy | G06F 21/86 |
| 2022/0327249 | A1* | 10/2022 | Kulkarni | G06F 21/86 |

FOREIGN PATENT DOCUMENTS

WO    WO-0163994 A2 *    8/2001    ............. G06F 21/86

* cited by examiner

*Primary Examiner* — Anthony M Haughton
(74) *Attorney, Agent, or Firm* — McDermott Will & Emery LLP

(57) ABSTRACT

An intrusion detection apparatus, including: a printed circuit board (PCB), including: an electrical switch, the electrical switch including: conductive pads positioned on a top layer of the PCB, and a conductive ground ring positioned on the top layer and surrounding the conductive pads; and a mechanical pin coupled to a first portion of a chassis of the information handling system at a first end of the mechanical pin, the mechanical pin including a conductive gasket positioned at a second end of the mechanical pin, the first end opposite to the second end, wherein the ground ring provides an intrusion signal when a foreign conductive object is in contact with the ground ring to indicate a presence of the foreign conductive object.

12 Claims, 12 Drawing Sheets

INTRUSION DETECTION APPARATUS FOR AN INFORMATION HANDLING SYSTEM

BACKGROUND

Field of the Disclosure

The disclosure relates generally to an information handling system, and in particular, an intrusion detection apparatus for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in an intrusion detection apparatus, including a printed circuit board (PCB), including an electrical switch, the electrical switch including conductive pads positioned on a top layer of the PCB, and a conductive ground ring positioned on the top layer and surrounding the conductive pads; and a mechanical pin coupled to a first portion of a chassis of the information handling system at a first end of the mechanical pin, the mechanical pin including a conductive gasket positioned at a second end of the mechanical pin, the first end opposite to the second end, wherein, when the first portion of the chassis is coupled to remaining portions of the chassis of the information handling system, the conductive gasket is in contact with the conductive pads to provide a signal indicating that the first portion of the chassis is coupled to the remaining portions of the information handling system, wherein the ground ring provides an intrusion signal when a foreign conductive object is in contact with the ground ring to indicate a presence of the foreign conductive object.

Other embodiments of these aspects include corresponding systems and apparatus.

These and other embodiments may each optionally include one or more of the following features. For instance, when the first portion of the chassis is not coupled to the remaining portions of the information handling system, the conductive gasket ceases to make contact with the conductive pads to provide a signal indicating that the first portion of the chassis is not coupled to the remaining portions of the information handling system. The PCB further includes a bottom layer and an internal layer, the bottom layer positioned opposite to the top layer and the internal layer positioned between the top layer and the bottom layer, wherein the electrical switch further includes conductive paths coupled to the conductive pads, the conductive paths positioned within the internal layer of the PCB or the bottom layer of the PCB. The conductive paths are positioned with the internal layer of the PCB. The conductive paths are positioned within the bottom layer of the PCB. The ground ring provides the intrusion signal that the foreign conductive object is in contact with the ground ring. The electrical switch includes two conductive pads.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
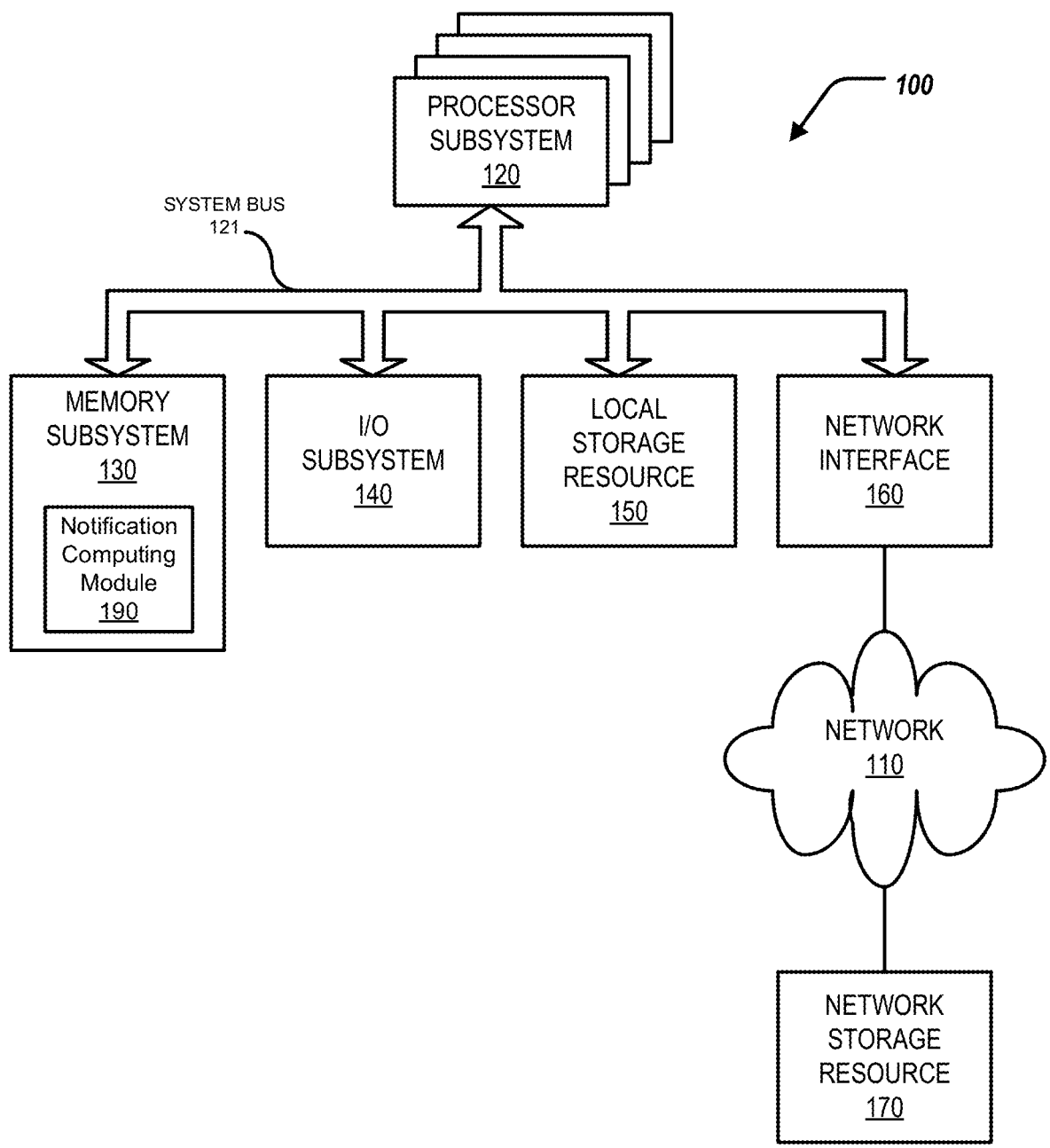
FIG. 1 is a block diagram of selected elements of an embodiment of an information handling system.

This disclosure discusses an intrusion detection apparatus for an information handling system. In short, an intrusion detection system of an information handling system can protect malicious intrusions of a chassis of the information handling system. The intrusion detection system can include an electrical switch that includes conductive paths that are routed in inner or bottom layers of a printed circuit board (PCB); and further include a ground ring to detect possible intrusion.

Specifically, this disclosure discusses an intrusion detection apparatus, including a printed circuit board (PCB), including: an electrical switch, the electrical switch including: conductive pads positioned on a top layer of the PCB, and a conductive ground ring positioned on the top layer and surrounding the conductive pads; and a mechanical pin coupled to a first portion of a chassis of the information handling system at a first end of the mechanical pin, the mechanical pin including a conductive gasket positioned at a second end of the mechanical pin, the first end opposite to the second end, wherein, when the first portion of the chassis is coupled to remaining portions of the chassis of the information handling system, the conductive gasket is in contact with the conductive pads to provide a signal indicating that the first portion of the chassis is coupled to the remaining portions of the information handling system, wherein the ground ring provides an intrusion signal when a foreign conductive object is in contact with the ground ring to indicate a presence of the foreign conductive object.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-11 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as: display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a notification computing module 190. The notification computing module 190 can be included by the memory subsystem 130. The notification computing module 190 can include a computer-executable program (software). The notification computing module 190 can be executed by the processor subsystem 120.

In short, an intrusion detection system of the information handling system 100 can protect malicious intrusions of a chassis of the information handling system 202. The intrusion detection system can include an electrical switch that includes conductive paths that are routed in inner or bottom layers of a printed circuit board (PCB); and further include a ground ring to detect possible intrusion.

Figure 2:
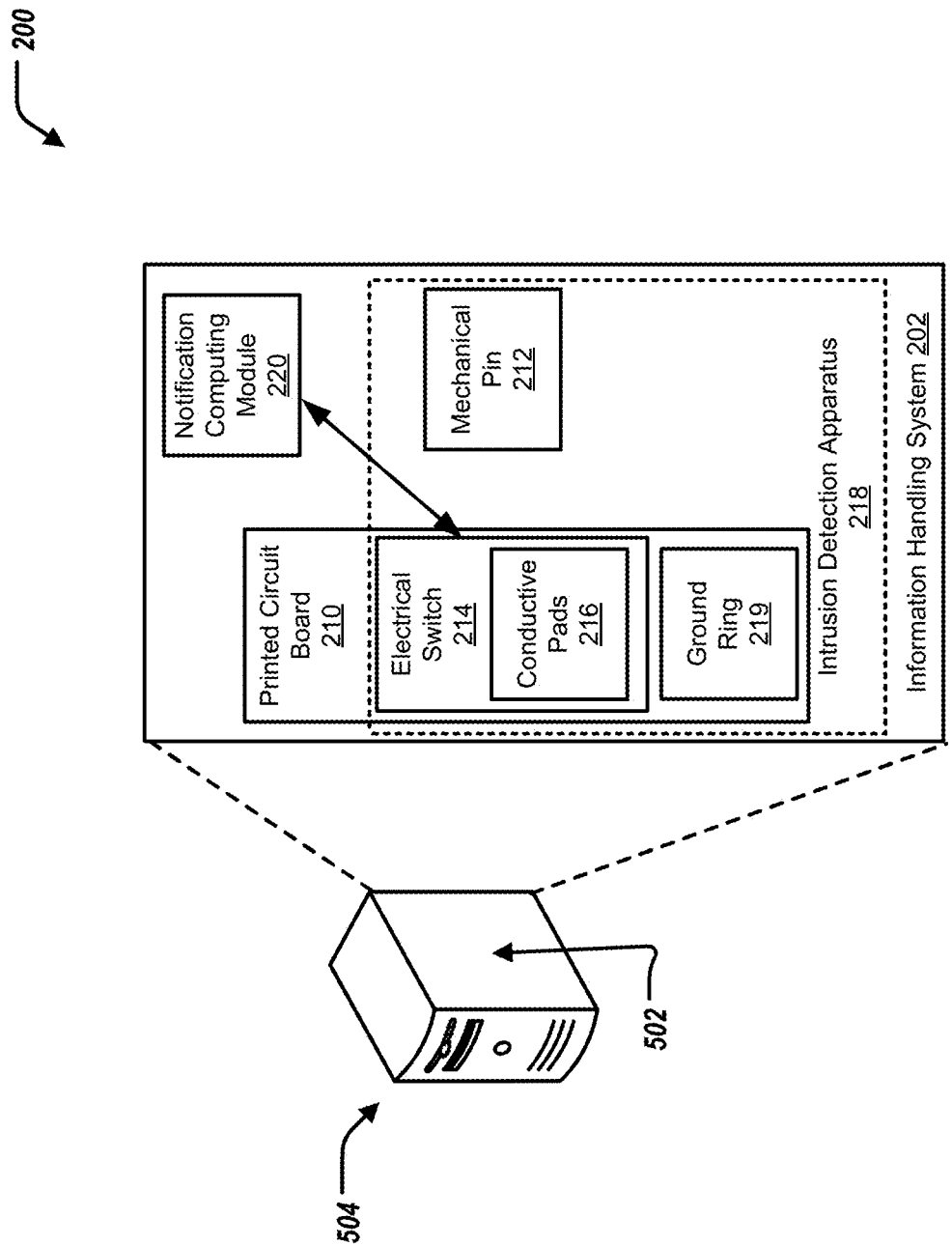
FIG. 2 illustrates a block diagram of an information handling system, including an intrusion detection apparatus.

Turning to FIG. 2, FIG. 2 illustrates an environment 200 including an information handling system 202. The information handling system 202 can include a printed circuit board (PCB) 210 and a mechanical pin 212. In some examples, the information handling system 202 is similar to, or includes, the information handling system 100 of FIG. 1.

The PCB 210 can include an electrical switch 214 and a conductive ground ring 219. The electrical switch 214 can include conductive pads 216.

The information handling system 202 can further include an intrusion detection apparatus 218. The intrusion detection apparatus 216 can include the electrical switch 216, the mechanical pin 212, and the conductive ground ring 219.

The information handling system 202 can further include a notification computing module 220. In some examples, the notification computing module 220 is similar to, or includes, the notification computing module 190 of FIG. 1.

Figure 3:
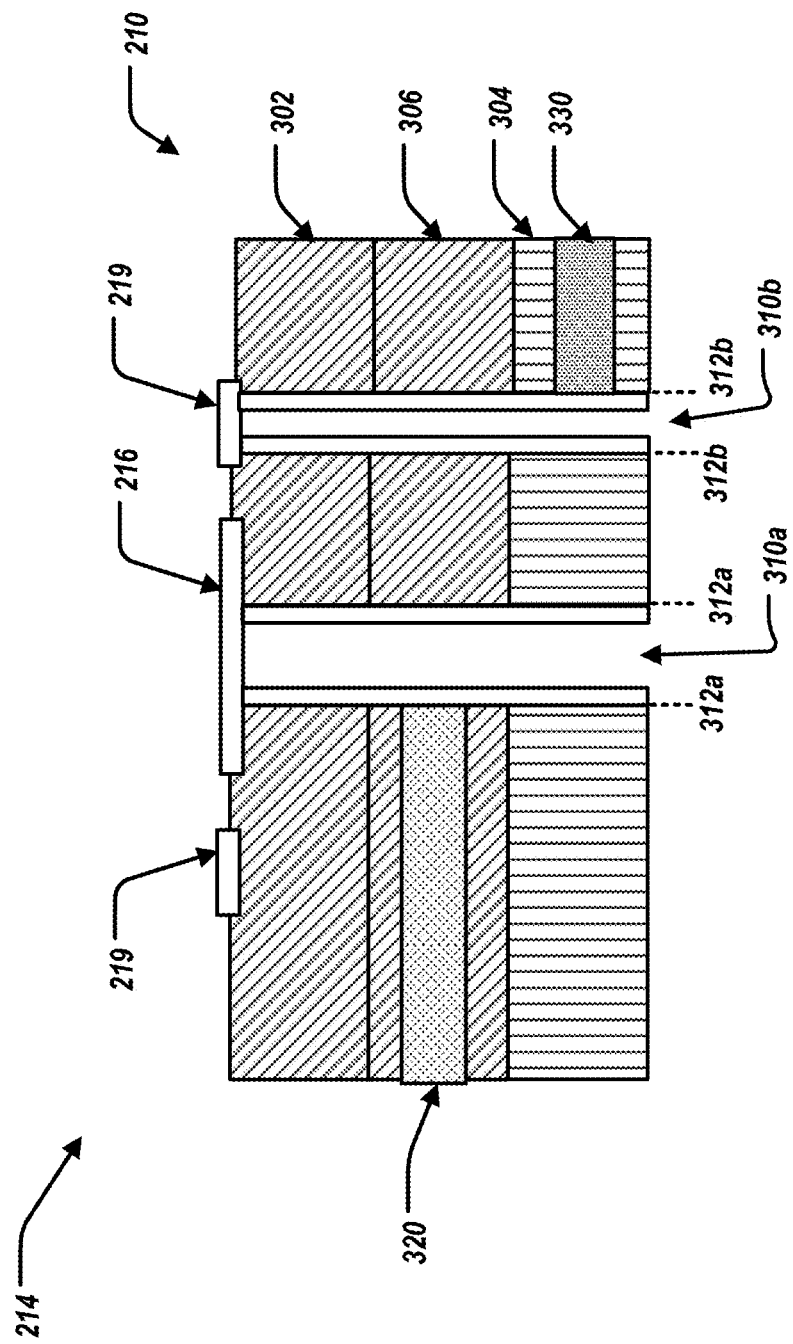
FIG. 3 illustrates a cut-away side view of a portion of a printed circuit board (PCB).

FIG. 3 illustrates a cut-away side view of a portion of the PCB 210. The PCB 210 can include a top layer 302, a bottom layer 304, and an internal layer 306 (however, the PCB 210 can include any number of internal layers). The bottom layer 304 is positioned opposite to the top layer 302, with the internal layer 306 positioned between the top layer 302 and the bottom layer 306.

The PCB 210 can further include vias 310a, 310b (collectively referred to as vias 310). The vias 310 can be plated (by electroplating) on sidewalls 312a, 312b (collectively referred to as sidewalls 312) with an electrically conductive material (e.g., copper).

The conductive pad 216 (or pads 216) can be positioned on the top layer 302 of the PCB 210. In some examples, the electrical switch 214 can include two or more conductive pads 216.

The electrical switch 214 can further a conductive path 320 (or conductive paths 320) coupled to the conductive pads 216. The conductive path 320 can be positioned within the internal layer 306, the bottom layer 304, or both. As illustrated, the conductive path 320 is positioned within the internal layer 306. The conductive path 320 can be coupled to the conductive pad 216, and specifically, coupled to the conductive pad 216 by the electrically conductive material positioned on the sidewalls 312a. Furthermore, the conductive path 320 can provide a connection/coupling between the electrical switch 214, and in particular, between the conductive pads 216 and the notification computing module 220.

The conductive ground ring 219 can be positioned on the top layer 302 of the PCB 210. The conductive ground ring 219 can substantially surround the conductive pad 216 (or pads 216).

The electrical switch 214 can further include a conductive path 330 (or conductive paths 330) coupled to the conductive ground ring 219. The conductive path 330 can be positioned within the internal layer 306, the bottom layer 304, or both. As illustrated, the conductive path 330 is positioned within the bottom layer 304. The conductive path 330 can be coupled to the conductive ground ring 219, and specifically, coupled to the conductive ground ring 219 by the electrically conductive material positioned on the sidewalls 312b. Furthermore, the conductive path 320 can provide a connection/coupling between the electrical switch 214, and in particular, between the conductive ground ring 219 and the notification computing module 220.

To that end, when the conductive paths 320, 330 are positioned within the bottom layer 304, the internal layer 306, or both, the electrical switch 214 is provided from malicious attack to the electrical switch 214. Specifically, physical change and/or damage to the electrical paths 320, 330 is prevented by placing the electrical paths 320, 330 within the bottom layer 304, the internal layer 306, or both, by preventing external access to the electrical paths 320, 330.

Figure 4A:
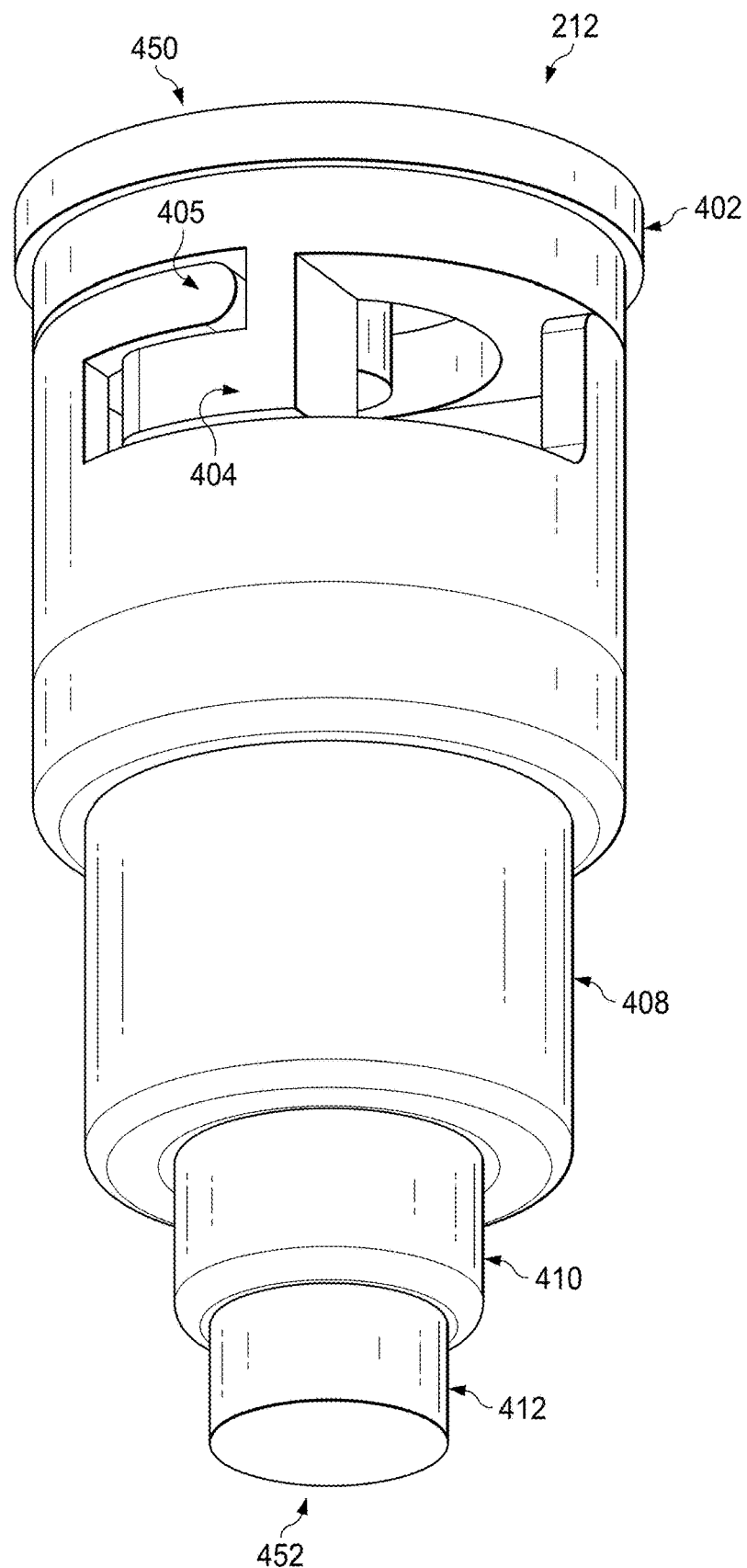
FIGS. 4A, 4B illustrate a physical representation of a mechanical pin of the intrusion detection apparatus.
Figure 4B:
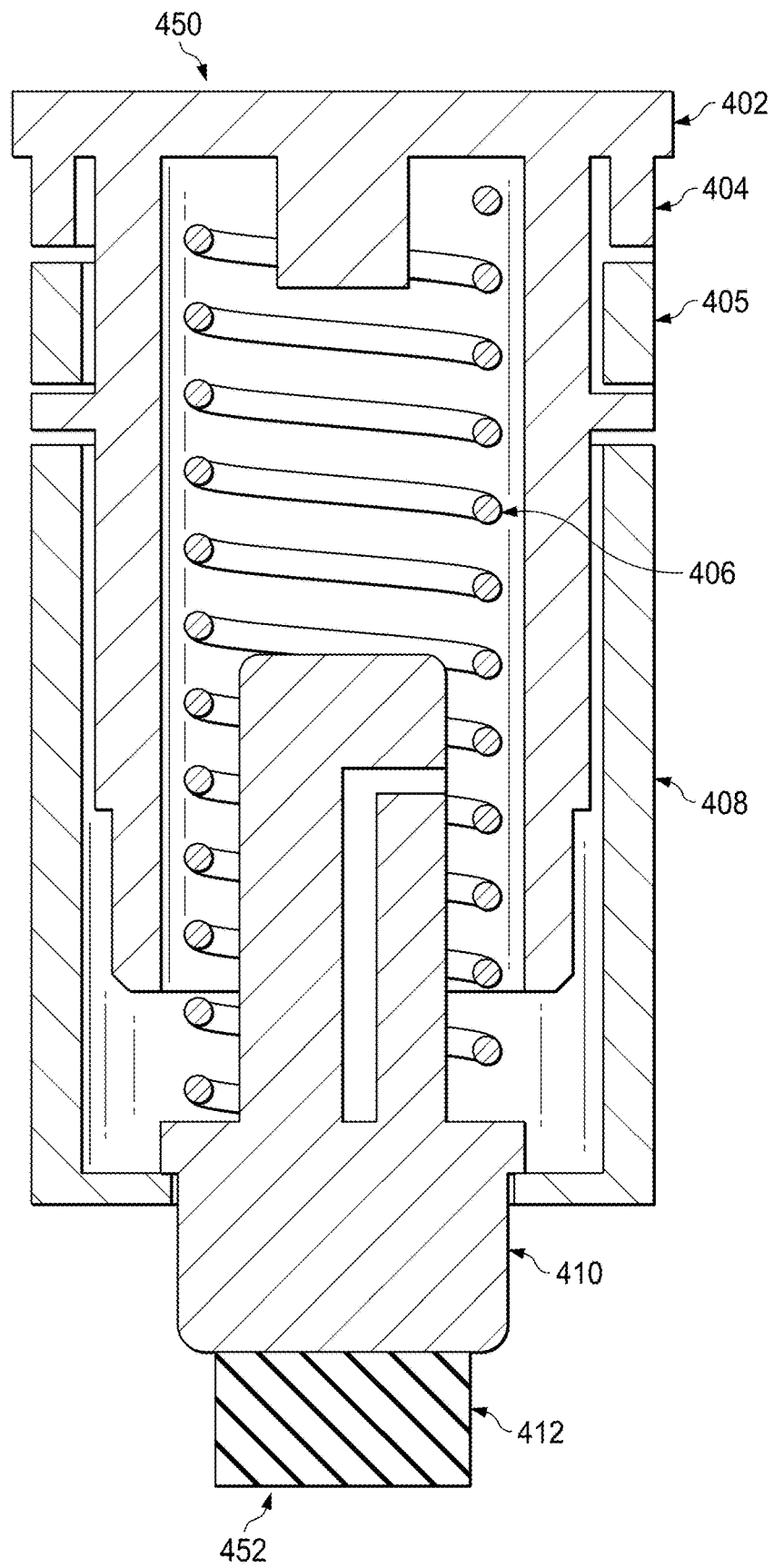

FIGS. 4A, 4B illustrate a physical representation of the mechanical pin 212. Specifically, FIG. 4A illustrates a perspective view of the mechanical pin 212; and FIG. 4B illustrates a side cut-away view of the mechanical pin 212. The mechanical pin 212 can include a back cover 402, a first hooking member 404, a second hooking member 405, a spring element 406, a holder 408, a pin 410, and a conductive gasket 412. The mechanical pin 212 can include a first end 450 and a second end 452, with the second end 452 positioned opposite to the first end 450. The conductive gasket 412 can be positioned at the second end 452 of the mechanical pin 212.

Figure 5:
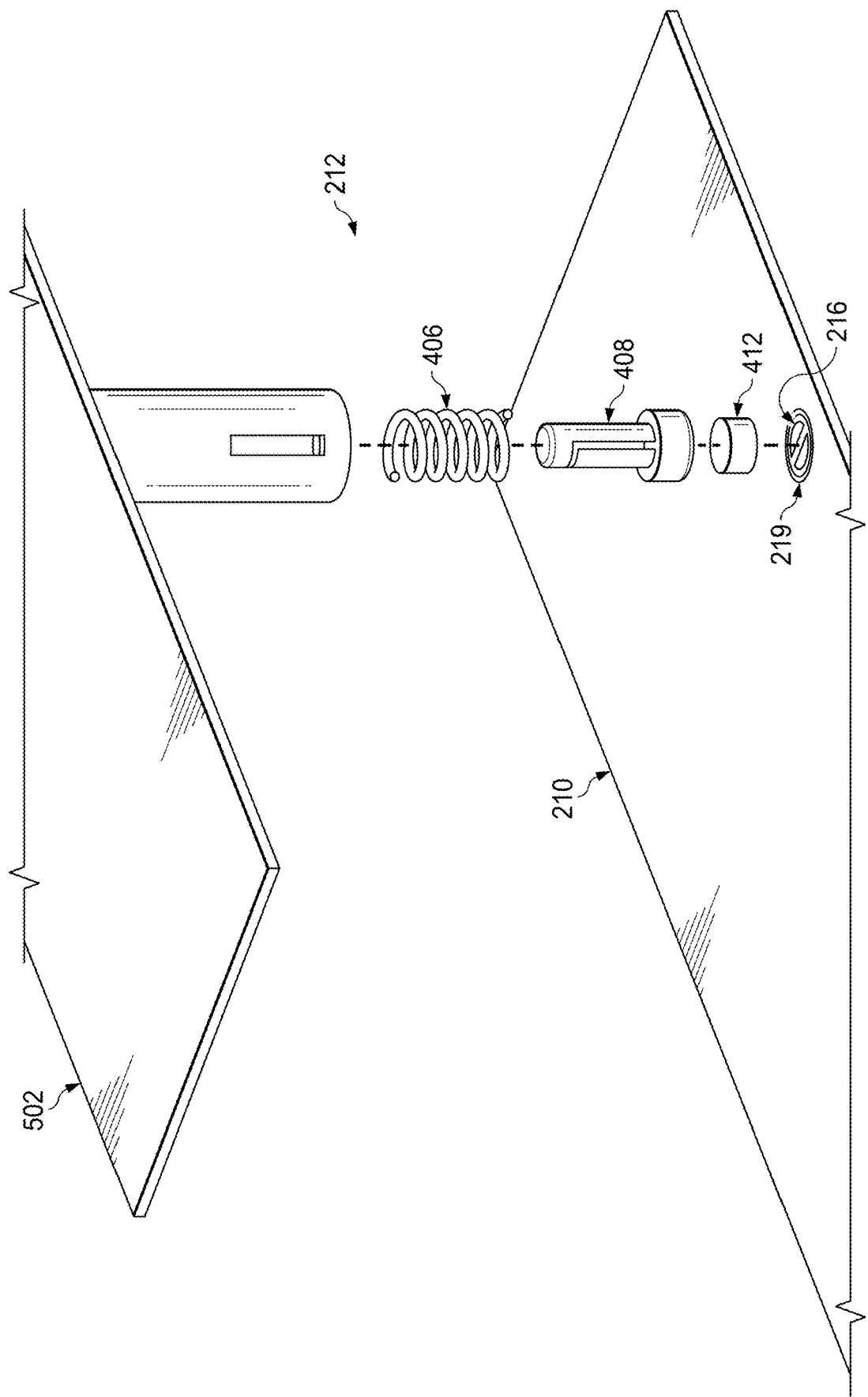
FIG. 5 illustrates an exploded view of the mechanical pin and the PCB.

FIG. 5 illustrates an exploded view of the mechanical pin 212 and the PCB 210. As shown, the mechanical pin 212 can be coupled to a first portion 502 of a chassis 504 of the information handling system 202 (also shown in FIG. 2). Specifically, the first end 450 of the mechanical pin 212 can be coupled to the first portion 502 of the chassis 504.

Figure 6:
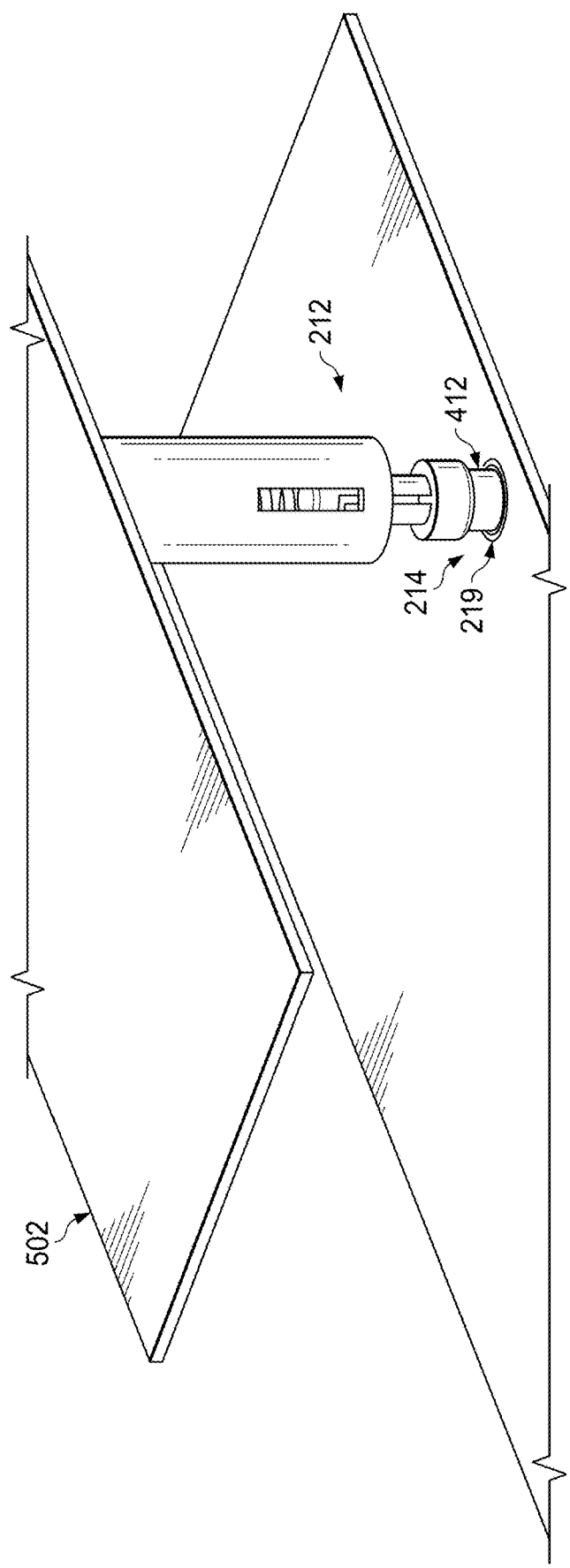
FIG. 6 illustrates a conductive gasket of the mechanical pin in contact with a conductive pad of an electrical switch of the intrusion detection apparatus.

FIG. 6 illustrates the conductive gasket 412 of the mechanical pin 212 in contact with the conductive pad 216 (or conductive pads) of the electrical switch 214. Specifically, when the first portion 502 of the chassis 504 is coupled to remaining portions of the chassis 504 of the information handling system 202 (as shown in FIG. 2), the mechanical pin 212 is in a first state such that the spring 406 is compressed, and the first hooking member 405 is engaged with the second hooking member 406 (shown in FIGS. 4A, 4B). When the mechanical pin 212 is in the first state and the first portion 502 of the chassis 504 is coupled to the remaining portions of the information handling system 202, the conductive gasket 412 is in contact with the conductive pad 216 (or conductive pads 216).

Figure 7:
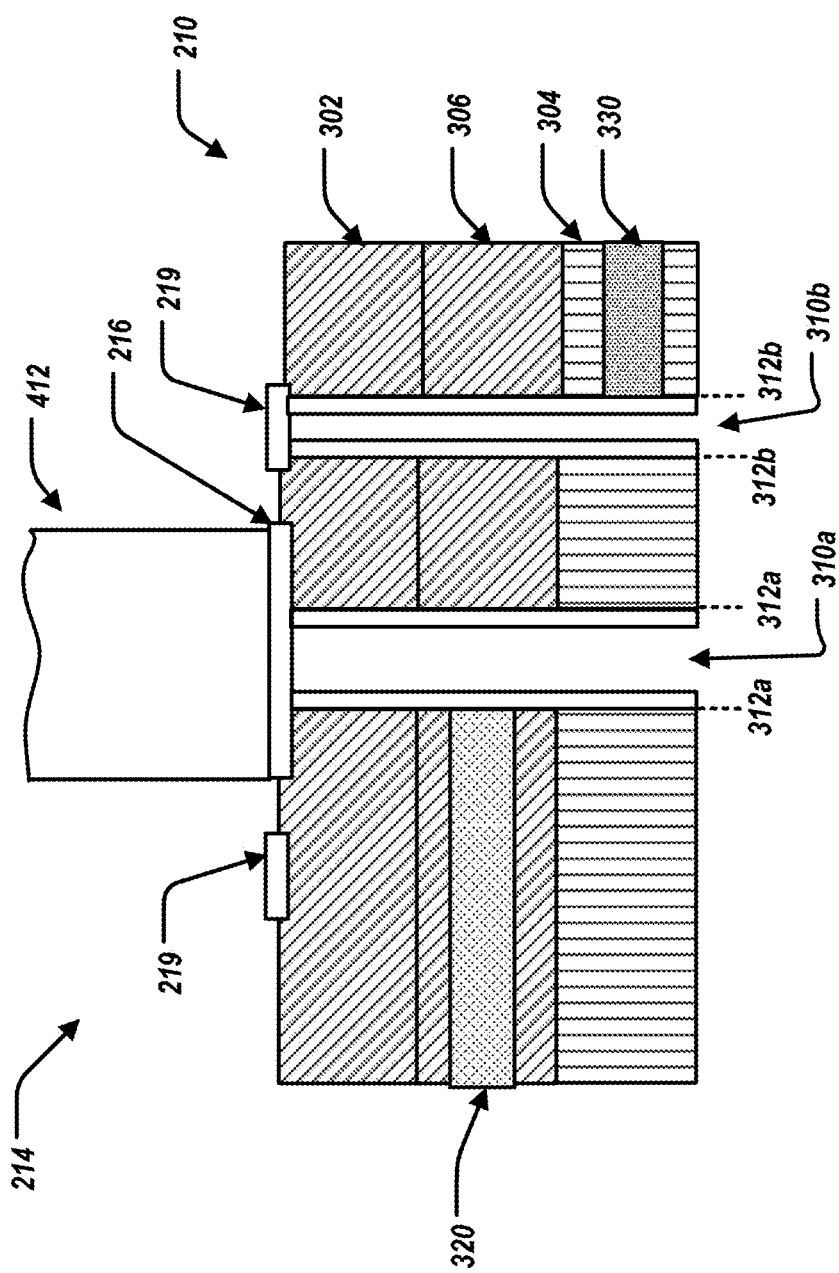
FIG. 7 illustrate a cut-away side view of a portion of the PCB, with the conductive gasket of the mechanical pin in contact with the conductive pad of the electrical switch.

FIG. 7 illustrate a cut-away side view of a portion of the PCB 210, with the conductive gasket 412 of the mechanical pin 212 in contact with the conductive pad (or conductive pads) 216 of the electrical switch 214. Referring to FIGS. 2, 6, and 7, to that end, when the conductive gasket 412 of the mechanical pin 212 in contact with the conductive pad 216, a signal is provided to the notification computing module 220 indicating that the first portion 502 of the chassis 504 is coupled to the remaining portions of the chassis 504 of the information handling system 202. Specifically, the signal is provided along the electrically conductive material of the sidewalls 312a to the conductive path 320 to ultimately the notification computing module 220.

Figure 8:
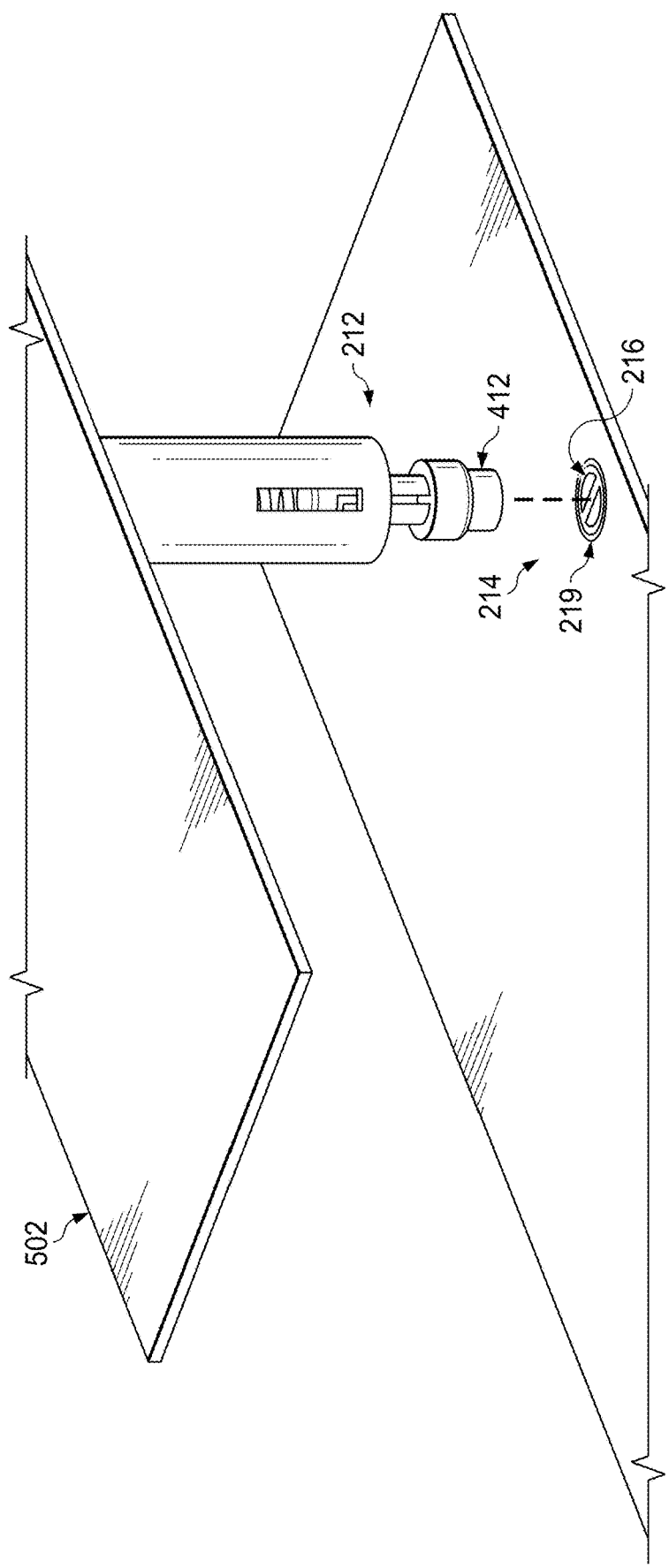
FIG. 8 illustrates the conductive gasket of the mechanical pin spaced-apart from the conductive pad of the electrical switch.

FIG. 8 illustrates the conductive gasket 412 of the mechanical pin 212 ceasing to make contact with the conductive pad (or conductive pads) 216 of the electrical switch 214 (spaced-apart from the conductive pad 216). Specifically, when the first portion 502 of the chassis 504 is not coupled to remaining portions of the chassis 504 of the information handling system 202, the mechanical pin 212 is in a second state such that the spring 406 is not compressed (expanded), and the first hooking member 405 is disengaged from the second hooking member 406. When the mechanical pin 212 is in the second state and the first portion 502 of the chassis 504 is not coupled to the remaining portions of the information handling system 202, the conductive gasket 412 ceases to be in contact with the conductive pad 216 (or conductive pads 216), and is spaced-apart from the conductive pad 216.

Figure 9:
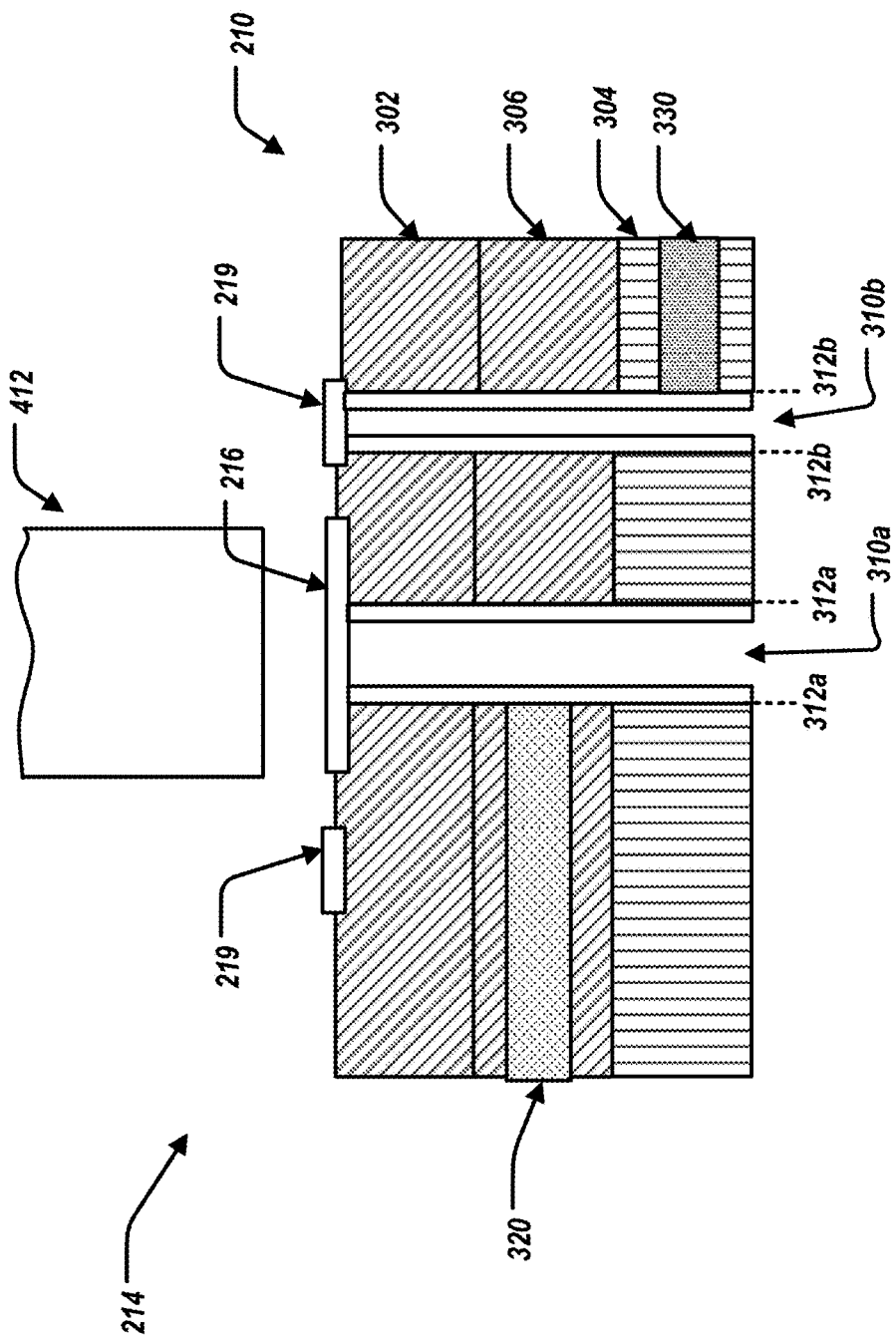
FIG. 9 illustrate a cut-away side view of a portion of the PCB, with the conductive gasket of the mechanical pin spaced-apart from the conductive pad of the electrical switch.

FIG. 9 illustrate a cut-away side view of a portion of the PCB 210, with the conductive gasket 412 of the mechanical pin 212 ceasing to be in contact with the conductive pad (or conductive pads) 216 of the electrical switch 214 (spaced-apart from the conductive pad 216). Referring to FIGS. 2, 8, and 9, to that end, when the conductive gasket 412 of the mechanical pin 212 ceases to be contact with the conductive pad 216, the signal is ceased to be provided to the notification computing module 220 indicating that the first portion 502 of the chassis 504 is coupled to the remaining portions of the chassis 504 of the information handling system 202. Furthermore, in some examples, when the conductive gasket 412 of the mechanical pin 212 ceases to be contact with the conductive pad 216, a signal is provided to the notification computing module 220 indicating that the first portion 502 of the chassis 504 is not coupled to the remaining portions of the chassis 504 of the information handling system 202. When the mechanical pin 212 ceases to be contact with the conductive pad 216 (i.e., the first portion 502 of the chassis 504 is not coupled to the remaining portions of the chassis 504 of the information handling system 202), an event can be logged in a data store table indicating such.

Figure 10:
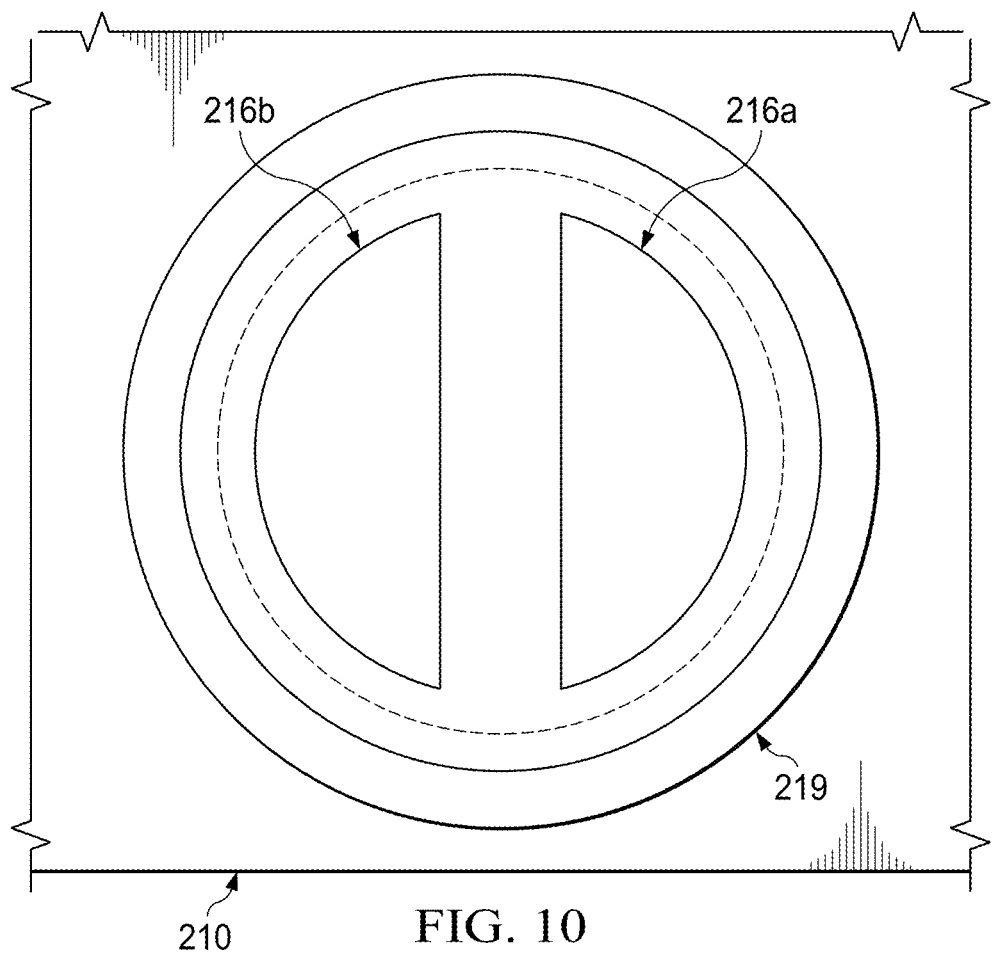
FIG. 10 illustrates a top down view of a portion of the PCB, with the conductive pads positioned on the PCB.

FIG. 10 illustrates a top down view of the a portion of the PCB 210, with the conductive pads 216 positioned on the PCB 210. As illustrated, the PCB 210 is shown including two conductive pads 216. Further, the conductive ground ring 219 surrounds the conductive pads 216.

Figure 11:
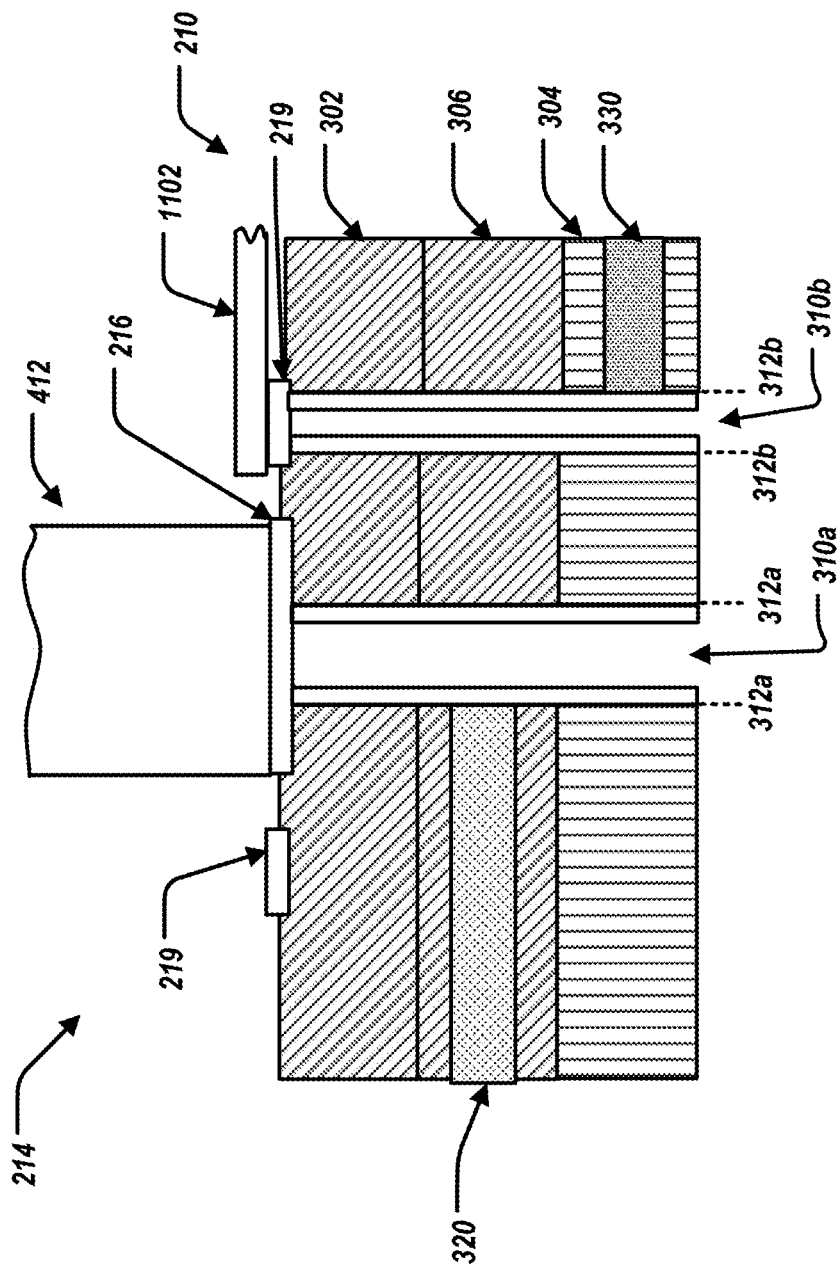
FIG. 11 illustrates cut-away side view of a portion of the PCB, with a foreign conductive object in contact with a ground ring of the intrusion detection apparatus.

To that end, when a foreign conductive object is in contact with the ground ring 219, the ground ring 219 can provide an intrusion signal to indicate the presence of the foreign conductive object. FIG. 11 illustrates a cut-away side view of a portion of the PCB 210, with a foreign conductive object 1102 in contact with the ground ring 219. In some cases, a malicious actor will attempt to short-circuit the conductive pads 216 by inserting the foreign conductive object 1102 to be in contact with the conductive pads 216, simulating the conductive gasket 412, and thus, potentially allowing decoupling of the first portion 502 of the chassis 504 from the remaining portions of the of the chassis 504 information handling system 202. However, the presence of the ground ring 219 prevents such malicious behavior such that when the malicious actor attempts to place the foreign conductive object 1102 in contact with the conductive pads 216, the foreign conductive object 1102 comes into contact with the ground ring 219 first. When the foreign conductive object 1102 comes into contact with the ground ring 219, the ground ring 219, in response, provides an intrusion signal to the notification computing module 220 indicating the presence of the foreign conductive object 1102. Specifically, the intrusion signal is provided along the electrically conductive material of the sidewalls 312b to the conductive path 330 to ultimately the notification computing module 220.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An intrusion detection apparatus, comprising:
a printed circuit board (PCB), including:
an electrical switch, the electrical switch including:
conductive pads positioned on a top layer of the PCB, and
a conductive ground ring positioned on the top layer and surrounding the conductive pads; and
a mechanical pin coupled to a first portion of a chassis of the information handling system at a first end of the mechanical pin, the mechanical pin including a conductive gasket positioned at a second end of the mechanical pin, the first end opposite to the second end,
wherein, when the first portion of the chassis is coupled to remaining portions of the chassis of the information handling system, the conductive gasket is in contact with the conductive pads to provide a signal indicating that the first portion of the chassis is coupled to the remaining portions of the information handling system,
wherein the ground ring provides an intrusion signal when a foreign conductive object is in contact with the ground ring to indicate a presence of the foreign conductive object.

2. The intrusion detection apparatus of claim 1, wherein, when the first portion of the chassis is not coupled to the remaining portions of the information handling system, the conductive gasket ceases to make contact with the conductive pads to provide a signal indicating that the first portion of the chassis is not coupled to the remaining portions of the information handling system.

3. The intrusion detection feature of claim 1, wherein the PCB further includes a bottom layer and an internal layer, the bottom layer positioned opposite to the top layer and the internal layer positioned between the top layer and the bottom layer, wherein the electrical switch further includes conductive paths coupled to the conductive pads, the conductive paths positioned within the internal layer of the PCB or the bottom layer of the PCB.

4. The intrusion detection apparatus of claim 3, wherein the conductive paths are positioned within the internal layer of the PCB.

5. The intrusion detection apparatus of claim 3, wherein the conductive paths are positioned within the bottom layer of the PCB.

6. The intrusion detection apparatus of claim 1, wherein the electrical switch includes two conductive pads.

7. An information handling system, comprising:
a processor;
memory media storing instructions executable by the processor to perform operations;
an intrusion detection apparatus, including:
an electrical switch, the electrical switch including:
conductive pads positioned on a top layer of the PCB, and
a conductive ground ring positioned on the top layer and surrounding the conductive pads; and
a mechanical pin coupled to a first portion of a chassis of the information handling system at a first end of the mechanical pin, the mechanical pin including a conductive gasket positioned at a second end of the mechanical pin, the first end opposite to the second end,
wherein, when the first portion of the chassis is coupled to remaining portions of the chassis of the information handling system, the conductive gasket is in contact with the conductive pads to provide a signal indicating that the first portion of the chassis is coupled to the remaining portions of the information handling system,
wherein the ground ring provides an intrusion signal when a foreign conductive object is in contact with the ground ring to indicate a presence of the foreign conductive object.

8. The information handling system of claim 7, wherein, when the first portion of the chassis is not coupled to the remaining portions of the information handling system, the conductive gasket ceases to make contact with the conductive pads to provide a signal indicating that the first portion of the chassis is not coupled to the remaining portions of the information handling system.

9. The information handling system of claim 7, wherein the PCB further includes a bottom layer and an internal layer, the bottom layer positioned opposite to the top layer and the internal layer positioned between the top layer and the bottom layer, wherein the electrical switch further includes conductive paths coupled to the conductive pads, the conductive paths positioned within the internal layer of the PCB or the bottom layer of the PCB.

10. The information handling system of claim 9, wherein the conductive paths are positioned within the internal layer of the PCB.

11. The information handling system of claim 9, wherein the conductive paths are positioned within the bottom layer of the PCB.

12. The information handling system of claim 7, wherein the electrical switch includes two conductive pads.

* * * * *